Figure 1:
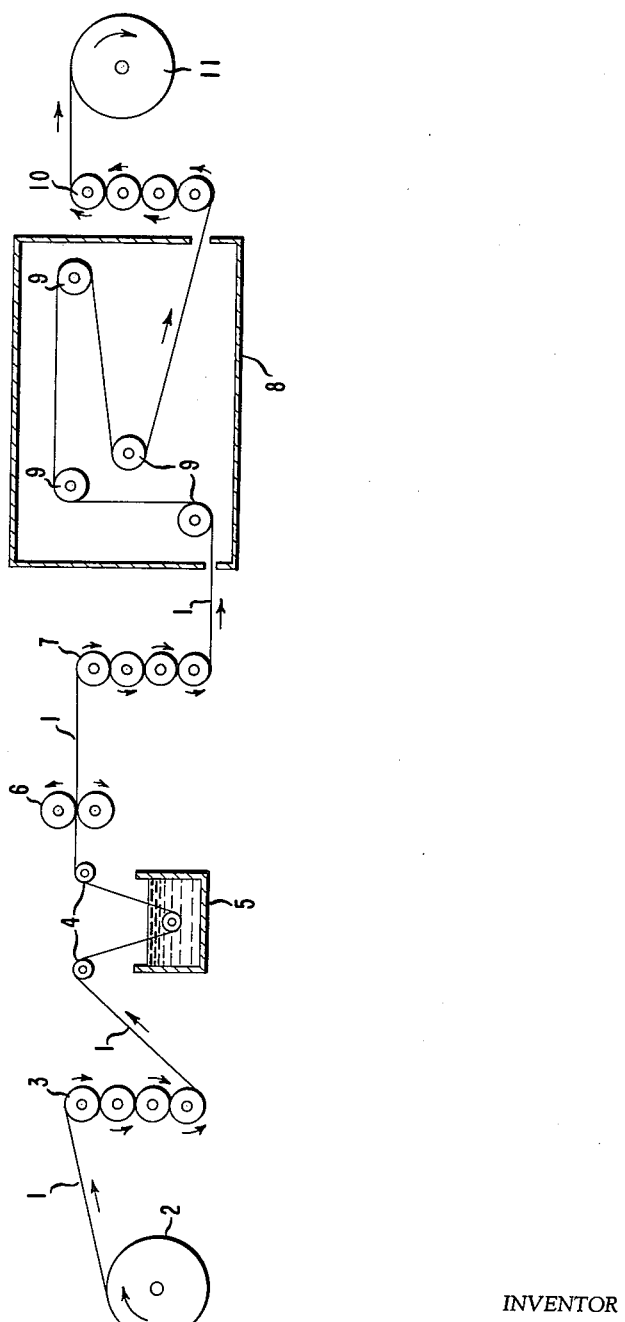

Aug. 28, 1962 G. PAMM 3,050,820
PROCESS FOR TREATING TIRE CORD
Filed Nov. 17, 1958

INVENTOR
GEORGES PAMM

BY *H William Patey*

ATTORNEY

United States Patent Office 3,050,820
Patented Aug. 28, 1962

3,050,820
PROCESS FOR TREATING TIRE CORD
Georges Pamm, Wilmington, Del., assignor to E. I. du Pont de Nemours and Company, Wilmington, Del., a corporation of Delaware
Filed Nov. 17, 1958, Ser. No. 774,340
1 Claim. (Cl. 28—75)

This invention relates to reinforced elastomeric articles such as pneumatic tires, more particularly to such articles reinforced with synthetic polymeric fibrous materials, and more specifically to improved methods for pretreating cords of such fibrous materials to condition their physical properties and provide good adhesion between said cords and the elastomer.

Cords made by twisting together synthetic continuous filament yarns are widely used to reinforce flexible elastomeric articles. Their high tensile strength and resistance to impacts and to flexing fatigue are particularly suited to such service. On the other hand, these materials do not naturally adhere well to elastomers and their smooth surface contour provides little opportunity for mechanical attachment. It has been found necessary to apply a suitable adhesive to the cords prior to combining them with the elastomer.

The most generally used adhesives are aqueous solutions of proteins or thermo-setting resins in combination with elastomer lattices and other compounding ingredients. The cords are passed through the adhesive solution and dried, usually by means of hot air, suitable devices being provided to control the tension. Tension control is used to determine the degree of penetration of the adhesive into the cord and the degree of shrinkage or stretching of the cord, as desired, to obtain the optimum physical properties in the finished cord.

In the pretreatment of regenerated cellulose cords many procedures have been proposed, apparently depending on the characteristics of the yarn as originally supplied by the fiber manufacturer, the nature of the adhesive chosen and the characteristics of the treated cord desired for the particular use. Thus, certain patents specify the lowest feasible tensions while dipping the cords in the adhesive solution while others, for example, U.S. 2,419,922, require tensions of 0.015 gram per denier in the dipping operation and as high as 0.1 gram per denier in the subsequent drying step. Temperatures of approximately 185° F. appear to be adequate to dry the cords and cure the resin constituent of the adhesive.

In the case of filamentary materials formed from synthetic polymers, which are thermoplastic, the final steps of the preparatory process require much higher temperatures and stretching of the cords to reduce the elongation of the cords, control their shrinkage under subsequent manufacturing or service conditions and in some cases increase their tensile strength. The initial steps of impregnation with ahdesive and drying may be similar to those for regenerated cellulose, but these are followed by hot stretching at much higher temperatures for synthetic filamentary materials.

For example, Canadian patent 556,626 proposes, for nylon cords, dipping in the adhesive solution at very low tension to achieve thorough penetration, drying at a moderate temperature and a tension of 0.6 to 0.8 gram per denier, and subsequently stretching at 425° F. for 24 to 36 seconds. Commercial equipment designed to treat nylon cords follows this proposal in that the maximum tension capacity during the impregnation step is generally about 0.1 gram per denier.

It is to be understood that the temperatures cited for the final hot stretching and heat setting step are the temperatures of the hot air circulated in the drying oven. The actual temperature reached by the cord depends on the time in the drier, the moisture content and the rate of air circulaion. The optimum air temperature must then vary somewhat depending on the particular conditions selected.

It is well understood that with thermoplastic fibers there are opposing influences occurring in the high temperature step. The stretching tends to increase the tenacity while the high temperatures tend to degrade the fibers. The balance between these two effects determines the final properties of the cord. Too long a period in the drier will produce cords of inferior quality. Furthermore, long periods in the drier result in reduced capacity and increased processing costs.

It is an object of this invention to provide a superior pretreated cord of synthetic polymeric filamentary materials for reinforcing elastomeric articles. A further objective is to provide such a pretreated cord having good adhesion to elastomers, high tensile strength per unit weight, and good resistance to flexing fatigue. Another objective is to provide an effective and economical process for producing such superior cords. Other objectives will appear hereinafter.

According to this invention these objectives are achieved by passing a twisted cord through an aqueous adhesive bath while maintaining the cords under a tension of at least about 0.4 gram per denier, removing the excess of adhesive solution from the surface, and with or without an intermediate partial drying subjecting the cord to a temperature approximating the softening or melting point of the polymer, being at least about 435° F., while maintaining the cord under an increased tension for a period sufficient to produce a total net stretch of the cord of at least about 6%. Cords comprising synthetic linear polyamide yarn having a tenacity of at least about 8.0 grams per denier withstand the temperature and stretch conditions of this process very well and provide excellent reinforcing cords for elastomeric articles. The detailed description of the present invention and its advantages is described below in terms of nylon, but the invention is not limited to this fiber. It is also applicable to other synthetic organic polymeric thermoplastic fibers, such as those from polyesters.

Since the first use of nylon yarns and cords for reinforcing elastomers, many improvements have been made in the composition of the material and in methods of manufacture. These in turn have permitted or required changes in the cord treating steps leading to better overall properties in the resulting cord. Types of nylon yarn have been produced which permit greater stretch in the high temperature zone, generally with higher air temperatures and stretch tensions. Such conditions have produced cords having a greater yardage per pound of cord together with increased tensile strength of the cord, both of which are substantial advantages. However, the higher temperatures increase the hazard of degradation and require precise control of variables such as time of heating. Each type of nylon yarn has its characteristic limiting conditions beyond which severe degradation and frequent cord breakages occur.

The earlier steps, including passing the cord through the aqueous adhesive solution at very low tension and partially or completely drying at moderate temperatures, have not required modification.

It has now been found that with superior types of nylon yarn, for example, that made by the process of Belgian Patent 549,180, very high temperatures and extensive stretching are required to obtain optimum properties. If these conditions are applied to dry cords or to cords which have been wet out with water only, excellent properties are obtained. However, if the cords are thoroughly impregnated with a conventional aqueous adhesive dip under low tension and then subjected to high tension and high temperature severe degradation occurs as shown by loss in tensile strength.

According to this invention, the degradation may be avoided and excellent cord properties obtained by increasing the tension in the cord while passing it through the aqueous adhesive to at least 0.4 gram per denier, preferably higher. Cords dipped at the preferred tensions, after removal of excess adhesive solution from the surface by wipers, quetsch rolls, air blasts or the like, may be immediately subjected to higher tension and to high temperatures to produce cords of excellent quality.

Any well-known adhesive may be used in accordance with this invention. In commercial treatment it has been found that the acidity or pH of the adhesive solution has some effect on finished cord properties and the optimum pH varies with nylon yarns of different manufacturers. One of the advantages of the process of this invention is that the cord properties obtained are much less sensitive to variations in pH of the adhesive solution. Other variables in the adhesive solution, such as the nature of the elastomer latex, the composition of the thermosetting resin, the ratio of the weight of elastomer content to that of the resin content, and the percentage of the total solids in the dipping solution, which have been found to influence the final cord properties, have smaller effects when used in the practice of this invention.

FIGURE 1 shows in diagrammatic form a suitable apparatus for carrying out the present invention. The cords 1, in the form of a sheet of parallel cords, with or without a small number of cross threads (not shown) to maintain lateral register, are drawn from a supply roll 2 by a forwarding and restraining means 3, which in this embodiment is a stack of rolls which are interconnected and driven by means suitable for controlling their speed of rotation (not shown). The cord sheet is then guided by idler rollers 4 to and through a tank 5 containing an aqueous adhesive solution. The cord sheet 1 then passes through quetsch rolls 6 to remove excess adhesive solution from the surface of the cords and thence to a second driven forwarding and restraining means 7 similar to 3. The cord sheet, still wet with adhesive solution, then passes directly into hot stretching and drying oven indicated generally as 8, where it passes around idler rollers 9, out of the oven to the driven forwarding and restraining means 10 similar to 3 and to a collecting roll 11.

The tension between 2 and 3 is low and only sufficient to maintain and support the cord sheet 1 and to draw the sheet from the roll 2. The tension on the cord sheet between 3 and 7 is increased to at least 0.4 gram per denier by operating means 7 at a higher peripheral speed than that of 3. The tension between 7 and 10 may be made still higher by operating means 10 at a higher peripheral speed than that of 7. The tension between 10 and 11 is reduced to a lower value suitable for enrolling the treated cord.

Many variations of the apparatus and process are possible within the scope of this invention. The cord sheet 1 may be only one cord or a number of parallel cords, and these may be supplied from a creel rather than from a roll. The forwarding and restraining means 3, 7, and 10, shown as stacks of interconnected rollers, may take any form which can maintain the tension difference between the input and output sides while preventing substantial slippage and forwarding the cords at appropriate speeds. In certain cases, where substantially uniform tension is desired, means 7 may be by-passed. The quetsch rolls 6 may be replaced by wipers, air blasts, vibrators or other devices suitable for removing excess adhesive solution from the surface of the cords. The rolls 9 are shown as idler rolls giving essentially constant tension throughout the oven 8. It is sometimes desirable to reduce or increase the tension toward the end of the oven, which may be done by replacing one of the idler rolls 9 with a forwarding and restraining means similar to 10. It may also be desirable to cool the cord after hot stretching and before collecting on the receiving roll. For this purpose a lower temperature section may be added to the oven and cooling rolls or other cooling devices added after the oven. Such modifications which are known to those skilled in the art are within the scope of this invention.

In the examples demonstrating the improved process and product of this invention the following terms are used. Adhesive solution or adhesive dip refers to the aqueous system containing a heat setting resin, an elastomer latex or a mixture of elastomer lattices, and other compounding ingredients, some components of which may be in solution and others in a dispersed condition. Dipping tension is the tension on the cords while passing through the adhesive solution, expressed in grams per denier, the denier being determined on the raw or gray unstressed cord. Stretching tension refers to the tension, in pounds, on the cord while in the hot stretching oven. It is understood that the cord stretches gradually in the oven under substantially constant tension and its actual denier is changing during this period. Net stretch is the percentage increase in length of cord in going from the gray to the completely finished condition based on the initial length. Breaking strength is measured by conventional means and expressed in pounds. Tenacity is expressed in grams per denier. For treated cords the weight of adhesive added is neglected and the cord denier is calculated from the weight of nylon per unit length as determined by analysis.

The cords used in the examples are made from 840 denier nylon yarns by twisting the yarn approximately 12.5 turns in the Z direction and then plying two such twisted yarns with approximately 12.5 turns in the S direction. The exact twists used are varied slightly depending on the net stretch to be applied, to obtain a uniform degree of twist in the finished cord of 12 turns in the singles and 12 turns in the cord. Stretching temperature is the hot air temperature in the stretching oven and oven time is the time in seconds during which these conditions are applied.

The adhesive solution used in the following examples is prepared from the following composition:

Part A: | Parts
--- | ---
Resorcinol | 22
Formalin (37%) | 32.4
Sodium hydroxide | 0.6
Water | 476.8

Part B: |
--- | ---
"Gentac" | 488
Water | 122.2

Part A is added to part B with stirring, the resulting solution containing about 20% total solids and having a pH of 9.0 to 9.5. "Gentac" is an elastomer latex comprising a terpolymer of butadiene, styrene, and a vinyl pyridine sold under the trademark "Gentac" by the General Tire and Rubber Company. It contains about 41% elastomer solids.

EXAMPLE I

A high quality polyhexamethylene adipamide yarn made by the process of Beligan Patent 549,180, being of 840 denier, having a tenacity of 10.0 grams per denier and a breaking elongation of about 16.0% is converted into a two ply cord as indicated above. The cord is passed through an aqueous heat hardening rubber-to-cord adhesive. The excess adhesive solution is removed by quetsch rolls and the cord is then passed into a hot air drying and stretching oven operating under the conditions shown in Table I. In one case the cord is passed through the adhesive solution at a low tension of 0.12 gram per denier, and in another case at a much higher tension. The finished cord properties in Table I clearly show the superior properties resulting from high tension dipping.

*Table I*

|  | Gray | Low Dip Tension | High Dip Tension |
|---|---|---|---|
| Dip Tension, grams per denier |  | 0.12 | 0.8 |
| Oven Temp., °F |  | 455 | 455 |
| Oven Time, sec |  | 60 | 60 |
| Net Stretch, percent |  | 11 | 11.1 |
| Break Strength, lbs | 33.0 | 25.7 | 35.7 |
| Tenacity, grams per denier | 7.6 | 6.5 | 8.9 |
| Break Elongation, percent | 23.6 | 11.0 | 16.7 |

EXAMPLE II

A commercial 840 denier nylon yarn (known by the trade-name of E. I. du Pont de Nemours and Co. as type 700) is converted into a two-ply cord as indicated above, adhesive is applied and excess removed under low and high dipping tension and the cord dried and stretched under the conditions shown in Table II.

*Table II*

|  | Gray | Low Dip Tension | High Dip Tension |
|---|---|---|---|
| Dip Tension, grams per denier |  | 0.12 | 1.8 |
| Oven Temp., °F |  | 445 | 445 |
| Oven Time, sec |  | 42 | 42 |
| Oven Tension, lbs |  | 7.1 | 7.2 |
| Net Stretch |  | 13.4 | 13.5 |
| Denier | 1,873 | 1,700 | 1,700 |
| Break Strength, lbs | 30.5 | 28.7 | 31.5 |
| Tenacity, grams per denier | 7.27 | 7.65 | 8.48 |
| Break Elongation, percent | 25.3 | 14.5 | 18.9 |

EXAMPLE III

The nylon cord of Example I is processed in three ways; (1) applying adhesive at low tension and passing the undried cord to the oven, (2) applying the adhesive at low tension and pre-drying before passing to the oven, and (3) applying the adhesive at high tension and passing the undried cord to the oven. The operating conditions given in Table III were a moderate temperature, a relatively short oven time, and a low net stretch. Under these mild conditions the three methods give equivalent results.

*Table III*

|  | Gray | Low Dip Tension No Pre-dry | Low Dip Tension plus Pre-dry | High Dip Tension No Pre-dry |
|---|---|---|---|---|
| Dip Tension, grams per denier |  | 0.12 | 0.12 | 1.5 |
| Pre-dry Temp., °F |  |  | 270 |  |
| Pre-dry Time, sec |  |  | 60 |  |
| Pre-dry Tension, lbs |  |  | 3 |  |
| Oven-Temp., °F |  | 425 | 425 | 425 |
| Oven Time, sec |  | 18 | 18 | 18 |
| Oven Tension, lbs |  | 6 | 6 | 6 |
| Net Stretch, percent |  | 8 | 7.4 | 8.5 |
| Denier |  |  |  |  |
| Break Strength, lbs | 34.2 | 32.6 | 33.3 | 32.4 |
| Tenacity, grams per denier | 8.1 | 8.5 | 8.4 | 8.5 |
| Break Elong., percent | 25.5 | 17.2 | 18.2 | 19.1 |

EXAMPLE IV

The nylon cords of Example III are submitted to dipping and pre-drying conditions similar to Example III, but to severe oven conditions of high temperature, higher stretch and a longer time. Under these conditions, high tension dipping results in excellent cord properties and pre-drying causes little improvement over the poor properties obtained with low tension dipping.

*Table IV*

|  | Gray | Low Dip Tension No Pre-dry | Low Dip Tension Plus Pre-dry | High Dip Tension No Pre-dry |
|---|---|---|---|---|
| Dip Tension, grams per denier |  | 0.12 | 0.12 | 2.0 |
| Pre-dry Temp., °F |  |  | 270 |  |
| Pre-dry Time, sec |  |  | 60 |  |
| Oven Temp., °F |  | 455 | 455 | 455 |
| Oven Time, sec |  | 60 | 60 | 60 |
| Oven Tension, lbs |  | 8.0 | 8.5 | 8.0 |
| Net Stretch, percent |  | 11 | 14.9 | 11.1 |
| Break Strength | 33.0 | 25.7 | 26.6 | 35.7 |
| Tenacity, grams per denier | 7.6 | 6.5 | 7.0 | 8.9 |
| Break Elong., percent | 23.6 | 11 | 13.7 | 16.7 |

EXAMPLE V

The nylon cords of Example I are treated with adhesive at low and high tensions as in other examples and submitted in the oven to relatively high temperature and high net stretch. In addition, the same cord is subjected to still higher temperature and very high net stretch for 120 seconds. Even under these very severe conditions, the cord dipped in accordance with this invention has outstanding properties. The conditions and resulting properties are shown in Table V.

*Table V*

|  | Gray | Low Dip Tension | High Dip Tension A | High Dip Tension B |
|---|---|---|---|---|
| Dip Tension, grams per denier |  | 0.12 | 2.2 | 1.0 |
| Oven Temp., °F |  | 445 | 445 | 445 |
| Oven Time |  | 42 | 42 | 120 |
| Oven-Tension |  | 8.4 | 8.9 | 9.5 |
| Net Stretch |  | 13.6 | 13.3 | 18.0 |
| Denier | 1,886 | 1,680 | 1,700 |  |
| Break Strength, lbs | 33.5 | 26.5 | 33.4 | 33.5 |
| Tenacity, grams per denier | 8.1 | 7.15 | 8.9 | 9.2 |
| Break Elong., percent | 25.4 | 11.5 | 16.1 | 16.0 |

The reasons for the improvement in cord properties resulting from this invention are not known. The low cord tenacity observed with low tension dipping in Example I is not due to the temperature alone since dry cords or cords wet with water only may be hot stretched under these conditions to yield good properties. The presence of larger amounts of adhesive solids in the finished cord does not account for the reduced strength since cords dipped at low tension and containing comparatively large amounts of adhesive may be dried and stretched at lower temperatures to give cord properties equivalent to those obtained with high tension dipping. The degradation appears to be connected with the presence of the adhesive solution within the cord at the time that it is subjected to both high tension and high temperature. It is indeed surprising that increasing the dipping tension results in excellent properties and high net stretch at high temperatures.

Any increase in dipping tension above 0.1 gram per denier appears to have a beneficial effect. This effect becomes very substantial at 0.4 gram per denier and further improvement is obtained with increasing dipping tension up to over 2.5 grams per denier. Greater tensions give some improvement, but the improvement achieved would in some cases not justify the greatly increased expense in providing the necessary equipment.

The advantages of this invention are evident with some types of nylon at stretching temperatures as low as 425° F. and net stretch as low as 8%, but become increasingly valuable as the stretching temperature is increased above 440° F. and the net stretch above 12%. Temperatures of 455° F. which permit net stretch of 18% have been employed with no loss in cord breaking strength and substantial improvement in tenacity.

In addition to the improved average cord properties, the process of this invention offers many other advantages. The use of high dipping tension seems to make the process less sensitive to variations in the acidity and composition of the adhesive solution, the type of finish on the original yarn and the earlier history of the yarn and cord. A very surprising finding is that in the practice of this invention longer exposure times are permissible without loss in strength. Cords have been maintained in the oven at 455° F. for two minutes without strength loss. This leveling or protective effect probably explains the fact that the process of this invention provides finished cords which are more uniform along their length, across the cord sheet, and from lot to lot.

As a further advantage the need for an intermediate drying stage at moderate temperatures is avoided, and, therefore, substantial savings in investment, floor space and operating costs may be realized. There may be occasions when, due to the presence of existing equipment or for convenience or economic reasons, it is desired to remove a portion of the water of the adhesive from the cord in a pre-dryer at a moderate temperatue of from about 270° to about 350° F. Such a step causes no harm in the practice of this invention so long as the tension in such a pre-dryer is maintained at least as high as that used in adhesive dipping. The process of this invention may also be used as one of the steps in a multi-stage hot-stretching process.

I claim:

An improved method for improving the break strength, tenacity, and break elongation properties substantially undiminished during the coating of a polyhexamethylene adipamide tire cord with a rubber adhesive solution for use in reinforced rubber tires, and for stabilizing said cord and its said break strength, tenacity, and break elongation properties against the detrimental effects of variations in the acidity of the adhesive and degradation due to prolonged exposure to the high temperatures encountered during the process, said method consisting solely of the steps in sequence of moving a polyhexamethylene adipamide tire cord having a tenacity of at least 8.0 grams per denier through an aqueous acidic rubber adhesive bath while maintaining the cord under a tension of from 0.4 to 2.5 grams per denier while said cord is immersed in said bath, subsequently removing excess adhesive solution from the cord and then moving said cord into a heating zone to subject the cord to a temperature of about 445° F. for a period of about two minutes duration while exerting sufficient tension to produce a total net stretch of about 12%, and finally removing the stretched cord from the heating zone and cooling it when the desired stretch has been achieved.

References Cited in the file of this patent

UNITED STATES PATENTS

| | | |
|---|---|---|
| 2,419,922 | Tippetts | Apr. 29, 1947 |
| 2,807,863 | Schenker | Oct. 1, 1957 |
| 2,844,488 | Meherg et al. | July 22, 1958 |
| 2,846,752 | Lessig | Aug. 12, 1958 |

FOREIGN PATENTS

| | | |
|---|---|---|
| 616,549 | Great Britain | Jan. 24, 1949 |